United States Patent [19]

Kishi et al.

[11] Patent Number: 4,845,563
[45] Date of Patent: Jul. 4, 1989

[54] VERTICAL DRIVING PULSE GENERATING CIRCUIT

[75] Inventors: Hiroyasu Kishi, Nitta; Hiromi Arai, Saitama, both of Japan

[73] Assignee: Sanyo Electric Co., Ltd., Moriguchi, Japan

[21] Appl. No.: 63,949

[22] Filed: Jun. 19, 1987

[30] Foreign Application Priority Data

Jun. 19, 1986 [JP] Japan .................. 61-143379
Jun. 19, 1986 [JP] Japan .................. 61-93747[U]

[51] Int. Cl.⁴ .............................................. H04N 5/04
[52] U.S. Cl. ...................................... 358/158; 358/148
[58] Field of Search ............... 358/158, 148, 150, 159; 331/20

[56] References Cited

U.S. PATENT DOCUMENTS 4,231,064 10/1980 Uchida .............................. 358/158

Primary Examiner—James J. Groody
Assistant Examiner—David E. Harvey
Attorney, Agent, or Firm—Armstrong, Nikaido, Marmelstein, Kubovcik & Murray

[57] ABSTRACT

A reset pulse having a desired pulse width is generated in a reset pulse generating circuit 14 in response to a vertical synchronizing signal selected and outputted from input selecting circuit 13 or a frequency-divided output signal of a vertical count down circuit 11, the vertical count down circuit 11 is reset by the reset pulse, and a vertical driving pulse $\phi_5$ with a predetermined period is generated. Furthermore, phases of the reset pulse and the frequency-divided output signal are compared in a phase comparing circuit 19, a period of a vertical synchronizing signal is determined, and the input selecting circuit 13 and a signal selecting circuit 18 are switched to each other in accordance with the result.

7 Claims, 8 Drawing Sheets

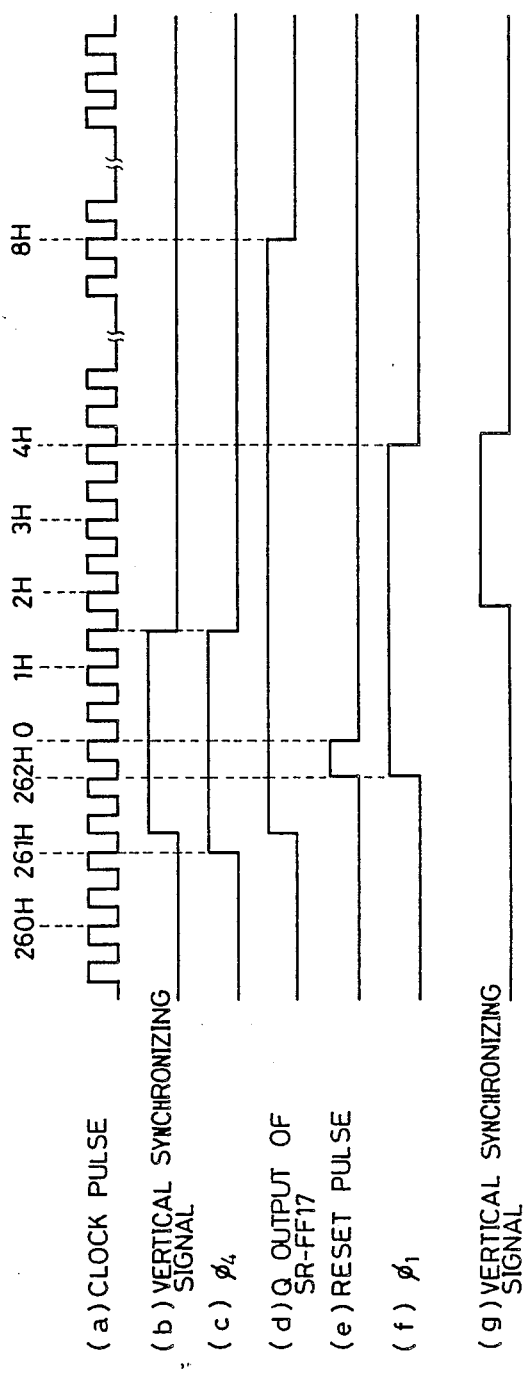

VERTICAL DRIVING PULSE GENERATING CIRCUIT

BACKGROUND OF THE INVENTION

1. Field of the Invention

The present invention relates to a vertical driving pulse generating circuit and more particularly, to a vertical driving pulse generating circuit of a count down system used in a television receiver or the like.

2. Description of the Prior Art

A vertical driving pulse generating circuit of a count down system is described in Japanese Patent Publication No. 7786/1986. FIG. 1 illustrates the circuit. In FIG. 1, a clock signal having a frequency two times that of a horizontal synchronizing signal supplied to a terminal 1 is frequency-divided into 1/525 by a frequency divider 2. Thus, a frequency-divided output signal having a predetermined pulse width is generated in a terminal 3. In addition, a composite sync signal inputted to a terminal 4 is applied to a vertical synchronizing separation circuit 5, where a vertical synchronizing signal is separated. An NAND gate 6 compares a phase of an output signal (vertical synchronizing signal) of the vertical synchronizing separation circuit 5 with a phase of the frequency-divided output signal of the frequency divider 2. If the phases coincide with each other, an octal counter 7 is reset. When the octal counter 7 is reset, a reset signal selecting circuit 8 receives the frequency-divided output signal of the frequency divider 2 in response to the output of the octal counter 7. Thus, the frequency divider 2 performs precise 1/525 frequency-dividing operation without relying on the vertical synchronizing signal externally applied. Furthermore, when the frequency-divided output signal of the frequency divider 2 and the vertical synchronizing signal are not synchronized with each other, the octal counter 7 counts pulses of the above described vertical synchronizing signal without being reset by the NAND gate 6. When eight pulses are counted, the reset signal selecting circuit 8 receives an output signal of the vertical synchronizing separation circuit 5 in response to the output of the octal counter 7. Thus, the frequency divider 2 performs frequency-dividing operation in response to the vertical synchronizing signal.

Therefore, according to the circuit shown in FIG. 1, if and when the frequency-divided output signal of the frequency divider 2 and the vertical synchronizing signal are asynchronous with each other, eight pulses of the vertical synchronizing signal are counted by the octal counter 7. As a result, when an 8th vertical synchronizing signal arrives, the frequency-divided output signal and the vertical synchronizing signal can be synchronized with each other.

However, in the circuit shown in FIG. 1, a vertical synchronizing signal from a video cassette recorder, a personal computer or the like having no normal vertical period of 262.5H (H is a period of a horizontal synchronizing signal) from a broadcasting station is applied to the terminal 4, there is a problem that synchronization is disturbed. For example, when a vertical synchronizing signal having a pulse width of 3H is applied to the terminal 4 with a period of 262H, it is determined that the phases of the vertical synchronizing signal and the frequency-divided output signal of the frequency divider 2 coincide with each other as a result of comparison of phase by the NAND gate 6, because the pulse width of the vertical synchronizing signal is 3H which is relatively long. Accordingly, the octal counter 7 is reset and the frequency divider 2 is reset with a period of 262.5H in response to the output, so that reproduced pictures gradually shift. As a result, the phases of the signals applied to the NAND gate 6 do not coincide with each other. When the octal counter 7 counts eight pulses of the vertical synchronizing signal, the frequency divider 2 is reset in response to the vertical synchronizing signal. The NAND gate 6 determines that the phases coincide with each other. Thus, the NAND gate 6 repeatedly determines whether or not phases coincide with each other, so that there is a problem that reproduced pictures vertically flow.

Furthermore, in the circuit shown in FIG. 1, if a channel is switched, the phases of the vertical synchronizing signal before switching and after switching do not generally coincide with each other, so that it is determined that the signals are asynchronous with each other. Eight vertical scanning periods (about 133 msec) are required until the frequency divider 2 is reset in response to the vertical synchronizing signal externally applied. Thus, the frequency divider 2 continues to be reset at phase of a vertical synchronizing signal in the previous channel until the frequency divider 2 counts eight pulses of the vertical synchronizing signal, so that the pictures remain shifted. Therefore, every time the channel is switched, a blanking pulse appears on the picture, so that there is a problem that the pictures are unclear.

SUMMARY OF THE INVENTION

A primary object of the present invention is to provide a vertical driving pulse generating circuit capable of always precisely generating a vertical driving pulse which is in synchronization with a vertical synchronizing signal without being affected by the pulse width of the vertical synchronizing signal in an inputted video signal.

Briefly stated, the vertical driving pulse generating circuit according to the present invention comprises signal generating means responsive to a clock signal having a frequency of N times a normal horizontal scanning frequency for generating a timing signal having the same period as a normal vertical scanning period and a vertical driving pulse. In addition, the vertical driving pulse generating circuit comprises input selecting means for selecting one of a vertical synchronizing signal separated from the video signal and the above described timing signal and outputting the same. A reset pulse is generated in response to an output of the input selecting means, so that the above described signal generating means is reset by the reset pulse. On the other hand, phases of the above described timing signal and the reset pulse are compared with each other, so that the input selecting means is switched depending on whether or not the phases coincide with each other. When the input selecting means selects the vertical synchronizing signal, the signal generating means is reset with the same period as that of the vertical synchronizing signal, so that a vertical driving pulse having the same period as the vertical synchronizing signal is generated. In addition, when the input selecting means selects the timing signal, the signal generating means is reset with a constant period defined by the timing signal, so that a vertical driving pulse having the constant period is generated.

According to the present invention, since a vertical synchronizing signal which passed through the input selecting means is converted into a reset pulse having a desired pulse width by reset pulse generating means and phases of the reset pulse and the timing signal are compared so that the period of the vertical synchronizing signal is determined, a vertical driving pulse can be always precisely obtained without being affected by the pulse width of the vertical synchronizing signal, so that the problem that reproduced pictures flow in receiving signals from an external apparatus can be solved.

These objects and other objects, features, aspects and advantages of the present invention will become more apparent from the following detailed description of the present invention when taken in conjunction with the accompanying drawings.

BRIEF DESCRIPTION OF THE DRAWINGS

FIGS. 6 to 8 are timing charts for explaining operation of the circuit shown in FIG. 5.

DESCRIPTION OF THE PREFERRED EMBODIMENTS

Figure 2:
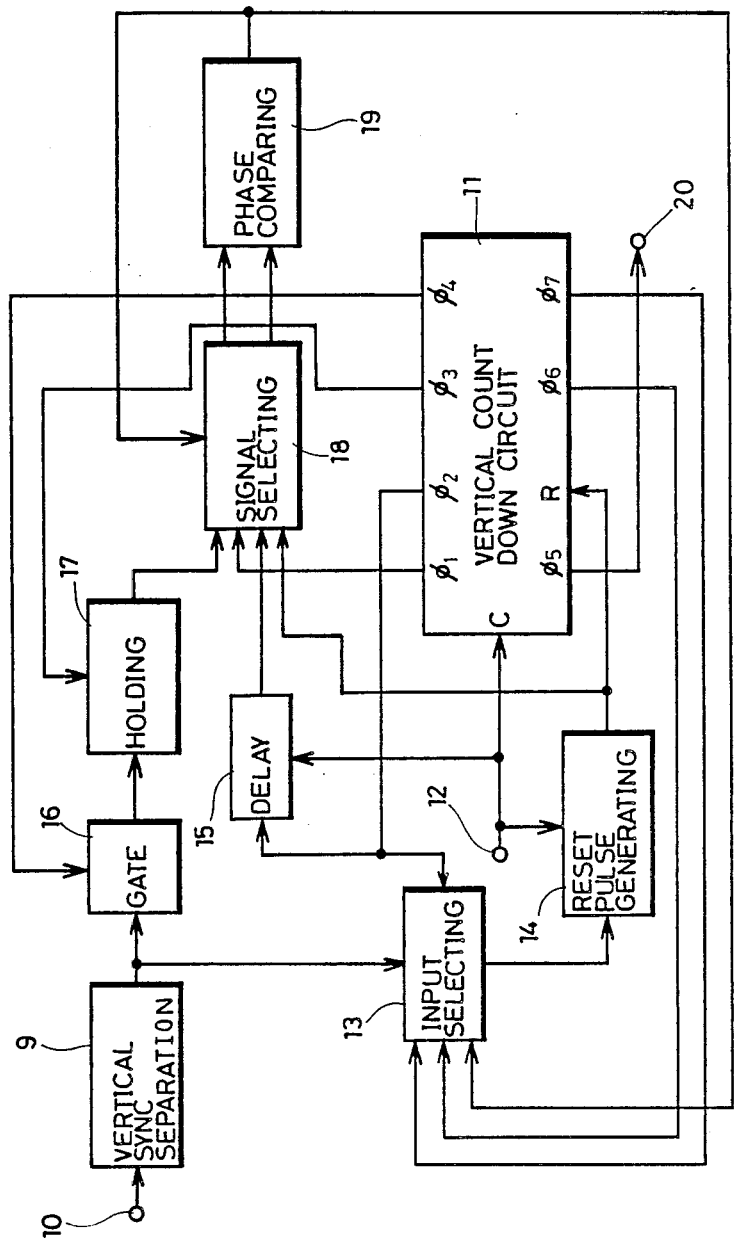
FIG. 2 is a block diagram showing a vertical driving pulse generating circuit according to an embodiment of the present invention.
Figure 3:
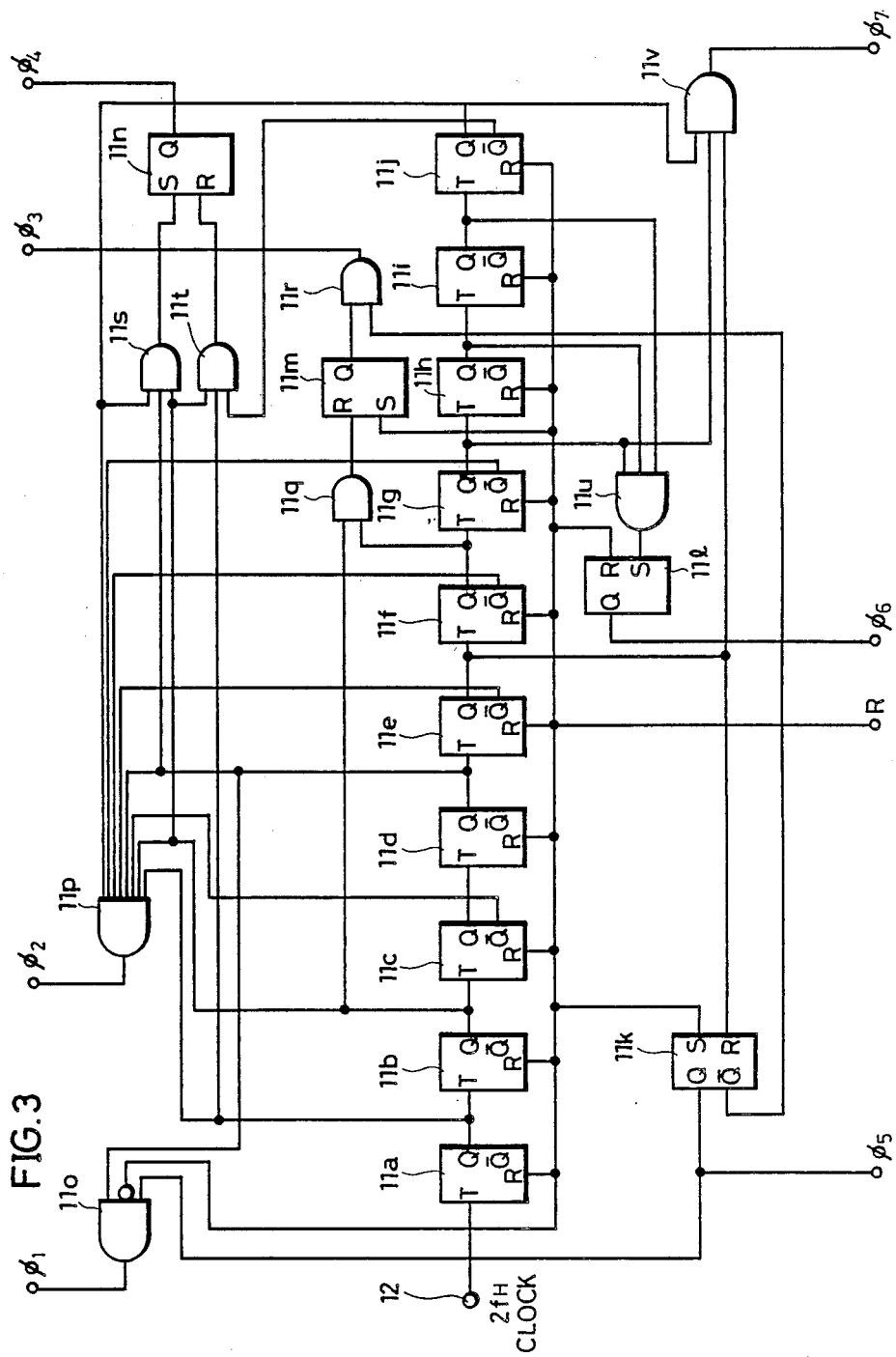
FIG. 3 is a circuit diagram showing a specific example of a vertical count down circuit 11 shown in FIG. 2.

FIG. 2 is a circuit diagram showing an embodiment of the present invention. In FIG. 2, a vertical synchronizing separation circuit 9 separates a composite sync signal inputted to a terminal 10 and extracts a vertical synchronizing signal. A vertical count down circuit 11 counts clock pulses (which may be integral multiples of $f_H$) of, for example, $2f_H$, ($f_H$ is a frequency of a horizontal synchronizing signal) applied to a terminal 12 and generates first to seventh output signals ($\phi_1$ to $\phi_7$). An input selecting circuit 13 selecting outputs one of the vertical synchronizing signal applied from the vertical synchronizing separation circuit 9 and the above described second output signal $\phi_2$. A reset pulse generating circuit 14 generates a reset pulse having a predetermined pulse width in response to an output signal of the input selecting circuit 13. A delay circuit 15 delays the second output signal $\phi_2$. The gate circuit 16 passes the vertical synchronizing signal in response to the fourth output signal $\phi_4$. A holding circuit 17 holds an output signal of the gate circuit 16 until the third output signal $\phi_3$ is applied. A signal selecting circuit 18 selects output signals of the reset pulse generating circuit 14 and the delay circuit 15, or output signals of the holding circuit 17 and the first output signal $\phi_1$. A phase comparing circuit 19 compares phases of the two output signals from the above described signal selecting circuit 18 and controls switching of the signals in the above described input selecting circuit 13 and the signal selecting circuit 18 as a result of comparison.

The above described vertical count down circuit 11 comprises T-FFs (T type flip-flop circuits) of ten stages 11a to 11j and a decoder (comprising RS type flip-flops 11k to 11n and AND gates 11o to 11v), in which a clock signal of $2f_H$ supplied from the terminal 12 is frequency-divided in the above described T-FFs of ten stages 11a to 11j, and each frequency-divided output is decoded and outputted.

Figure 4:
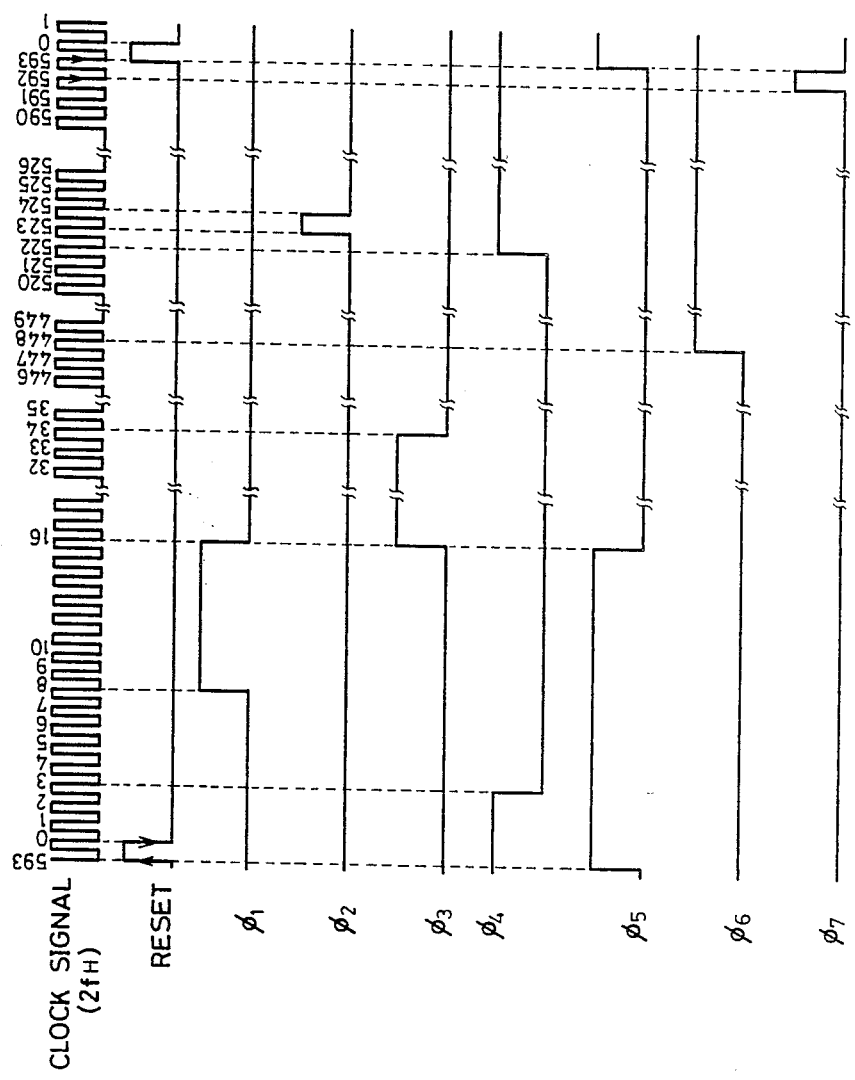
FIG. 4 is a timing chart showing first to seventh output signals $\phi_1$ to $\phi_7$ outputted from the vertical count down circuit 11, particularly during free running of the vertical count down circuit 11.

FIG. 4 is a time chart showing the first output signal $\phi_1$ to the seventh output signal $\phi_7$ at the time of free running of the vertical count down circuit 11. The first output signal $\phi_1$ is at an "H" level during the period from the 4th H to 8th H. The second output signal $\phi_2$ is at the "H" level during the period from the 261.5th H to the 262th H. The third output signal $\phi_3$ is at the "H" level during the period from the 8th H to the 17th H. The fourth output signal $\phi_4$ is at the "H" level during the period from the 261th H to the 1.5th H in the next vertical period. The fifth output signal $\phi_5$ is a vertical driving pulse which is at the "H" level during the period from the time of reset to the 8th H. The vertical driving pulse is applied to an output terminal 20. The sixth output signal $\phi_6$ is at the "H" level from the 224th H. The seventh output signal $\phi_7$ is a self-resetting signal generated at the 297th H.

In the case of an NTSC system, a period of a vertical synchronizing signal from a broadcasting station is 262.5H. On the other hand, a period of a vertical synchronizing signal from an external apparatus other than the above described broadcasting station, such as a video tape recorder and a personal computer varies due to various causes. In the present specification, a signal including a vertical synchronizing signal having a period of 262.5H is referred to as a television signal and a signal including a vertical synchronizing signal having a period other than 262.5H is referred to as a video signal.

Description is now made on operation according to an embodiment shown in FIG. 2. In the circuit shown in FIG. 2, assuming that the phase comparing circuit 19 generates an output signal at an "L" level, for example, the input selecting circuit 13 selects and outputs the vertical synchronizing signal from the vertical synchronizing separation circuit 9, and the signal selecting circuit 18 selects and outputs the output signals of the delay circuit 15 and the reset pulse generating circuit 14. In this state, if a video signal is inputted from the terminal 10 to the vertical synchronizing separation circuit 9, the separated vertical synchronizing signal is applied to the reset pulse generating circuit 14 through the input selecting circuit 13. Thus, the reset pulse having a predetermined pulse width corresponding to the above described vertical synchronizing signal is applied to a reset terminal of the vertical count down circuit 11. Accordingly, the vertical count down circuit 11 is reset, so that the vertical driving pulse $\phi_5$ having a timing corresponding to the above described reset pulse is generated and outputted to the output terminal 20. When a predetermined time period is elapsed after the vertical count down circuit 11 is reset, the second output signal $\phi_2$ is generated and applied to the signal selecting circuit 18 through the delay circuit 15. A reset pulse corresponding to the next vertical synchronizing signal is generated from the reset pulse generating circuit 14 and applied to the signal selecting circuit 18. At that time, an output of the phase comparing circuit 19 is at the "L" level, so that the signal selecting circuit 18 passes the two signals as it is.

If an input signal applied to the terminal 10 is a video signal, the phases of the two output signals (output signals of the reset pulse generating circuit 14 and the delay circuit 15) from the signal selecting circuit 18 do not coincide with each other, and thus the output signal of the phase comparing circuit 19 remains the "L" level. Therefore, the vertical count down circuit 11 is reset in response to the vertical synchronizing signal separated from the video signal, so that the vertical driving pulse $\phi_5$ is in synchronization with the vertical synchronizing signal.

If an input signal applied to the terminal 10 is a television signal, the phases of both the signals of the reset pulse generating circuit 14 and the delay circuit 15 coincide with each other, so that the output signal of the phase comparing circuit 19 is inverted to the "H" level. Therefore, the input selecting circuit 13 selects and outputs the second output signal $\phi_2$. In addition, the signal selecting circuit 18 selects the output signal of the holding circuit 17 and the first output signal $\phi_1$.

As a result, the second output signal $\phi_2$ is applied to the reset pulse generating circuit 14, so that the vertical count down circuit 11 performs so-called self-reset operation to be reset by output signal $\phi_2$ which is its own frequency-divided output. Therefore, the vertical count down circuit 11 generates a vertical driving pulse having a constant period corresponding to the clock signal from the terminal 12 to the output terminal 20 without being affected by a vertical synchronizing signal externally applied.

Incidentally, the vertical synchronizing signal applied from the vertical synchronizing separation circuit 9 is applied to the holding circuit 17 through the gate circuit 6 to which the fourth output signal $\phi_4$ is applied as a control signal (so-called window signal). The holding circuit 17 generates a signal at the "H" level when the above described vertical synchronizing signal is applied thereto. The signal at the "H" level, together with the first output signal $\phi_1$, is applied to the phase comparing circuit 19 through the signal selecting circuit 18. At that time, since the vertical synchronizing signal in the television signal arrives from the vertical synchronizing separation circuit 9, the phases of the two input signals in the phase comparing circuit 19 coincide with each other, so that the output continues to be held at the "H" level.

In this state, when switching to the external apparatus or the other channel is made, the phase relation between the vertical synchronizing signal synchronized and separated and the fourth output signal $\phi_4$ generated by the vertical count down circuit 11 is disturbed, so that the above described vertical synchronizing signal does not pass through the gate circuit 16. In addition, during a weak electric field, the vertical synchronizing signal is lacking. In such a state, the output of the holding circuit 17 attains the "L" level in response to the third output signal $\phi_3$. The signal selecting circuit 18 applies the signal at the "L" level and the first output signal $\phi_1$ to the phase comparing circuit 19. At that time, the phases of both the input signals do not coincide with each other in the phase comparing circuit 19, so that the output is inverted into the "L" level. As a result, the vertical count down circuit 11 is reset by the vertical synchronizing signal which externally arrives, so that a vertical driving pulse which is in synchronization with the vertical synchronizing signal is obtained in the output terminal 20.

More specifically, once it is determined that the signal is a television signal, the vertical count down circuit 11 performs self-reset operation without being externally affected and monitors the externally arriving vertical synchronizing signal. If abnormality is recognized, the above described self-reset operation is immediately released and operation returns to original determining operation.

Therefore, according to the circuit shown in FIG. 2, if the video signal arrives, the vertical count down circuit 11 is reset in response to the vertical synchronizing signal included in the above described video signal, so that the corresponding vertical driving pulse can be obtained. In addition, if the television signal arrives, the above described vertical count down circuit 11 is reset in response to the frequency-divided output signal of the above described vertical count down circuit 11, so that the corresponding vertical driving pulse can be obtained.

Although the sixth and seventh output signals $\phi_6$ and $\phi_7$ are not particularly required for explaining operation of the circuit shown in FIG. 2 and the explanation thereof is omitted, it is pointed out that the function thereof will be apparent from a circuit shown in FIG. 5 as described below.

Figure 5:
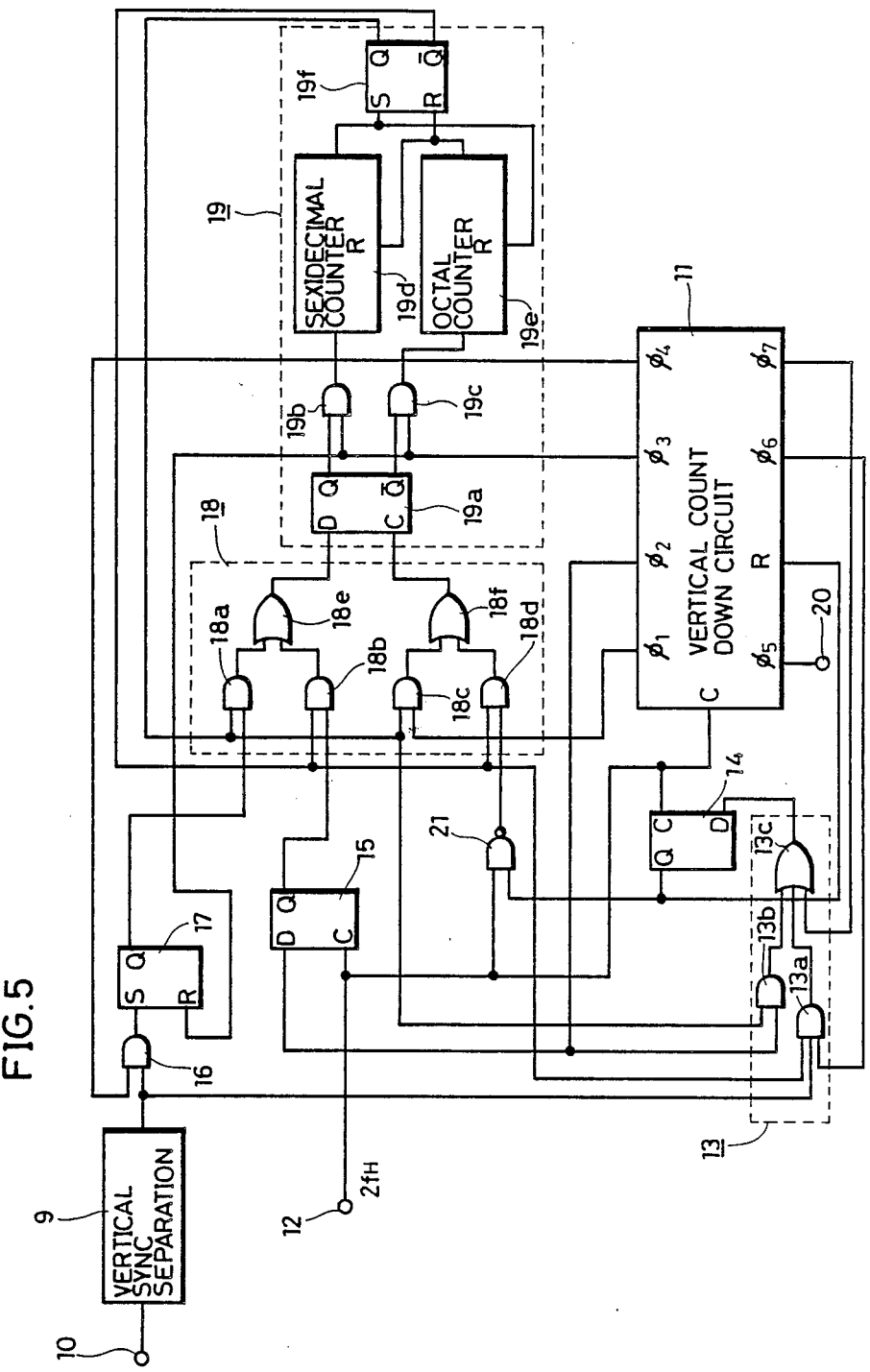
FIG. 5 is a circuit diagram showing a specific example of the circuit according to an embodiment shown in FIG. 2.

FIG. 5 is a circuit diagram showing a specific example of the embodiment shown in FIG. 2. In FIG. 5, portions corresponding to those shown in FIG. 2 have the same reference numerals. In FIG. 5, D-FFs (D type flip-flops) are used as the reset pulse generating circuit 14 and the delay circuit 15. An AND gate is used as the gate circuit 16 and a RS-FF (RS type flip-flop) is used as the holding circuit 17. The input selecting circuit 13 comprises AND gates 13a and 13b and an OR gate 13c. The signal selecting circuit 18 comprises AND gates 18a to 18d and OR gates 18e and 18f. The phase comparing circuit 19 comprises a D-FF 19a, AND gates 19b and 19c a sexidecimal counter 19d, an octal counter 19e and a RS-FF 19f. Furthermore, an NAND gate 21 is added.

Description is now made on a connection in the circuit shown in FIG. 5. The fourth output signal $\phi_4$ from the vertical count down circuit 11 and the vertical synchronizing signal from the vertical synchronizing separation circuit 9 are applied to the AND gate 16. The AND gate 16 has an output applied to a set input terminal S of the RS-FF 17. The RS-FF 17 has a reset input terminal R receiving the third output signal $\phi_3$ from the vertical count down circuit 11. The D-FF 15 has a C (clock) terminal receiving a clock signal from the terminal 12 and a D terminal receiving the second output signal $\phi_2$ from the vertical count down circuit 11. The clock signal from the terminal 12 and a Q output of the D-FF 14 are applied to the NAND gate 21. The above described vertical synchronizing signal, a $\bar{Q}$ output of the RS-FF 19f and the sixth output signal $\phi_6$ of the vertical count down circuit 11 are applied to the AND gate 13a. A Q output of the RS-FF 19f and the second output signal $\phi_2$ of the vertical count down circuit 11 are applied to the AND gate 13b. Outputs of the AND gates 13a and 13b and the seventh output signal $\phi_7$ of the vertical count down circuit 11 are applied to the OR gate 13c. The D-FF 14 has a C terminal receiving the above described clock signal and a D terminal receiving an output of the OR gate 13c. The vertical count down circuit 11 has a clock terminal C receiving the above described clock signal and a reset terminal R receiving the Q output of the D-FF 14. A Q output of the RS-FF 17 and the Q output of the RS-FF 19f are applied to the AND gate 18a. A Q output of the D-FF 15 and the $\overline{Q}$ output of the RS-FF 19f are applied to the AND gate 18b. The Q output of the RS-FF 19f and the first output signal $\phi_1$ of the vertical count down circuit 11 are applied to the AND gate 18c. The $\overline{Q}$ output of the RS-FF 19f and an output of the NAND gate 21 are applied to the AND gate 18d. Outputs of the AND gates 18a and 18b are applied to the OR gate 18e. Outputs of the AND gates 18c and 18d are applied to the OR gate 18f. The D-FF 19a has a C terminal receiving an output of the OR gate 18f and a D terminal receiving an output of OR gate 18e. A Q output of the D-FF 19a and the third output signal $\phi_3$ of the vertical count down circuit 11 are applied to the AND gate 19b. A $\overline{Q}$ output of the D-FF 19a and the above described third output signal $\phi_3$ are applied to the AND gate 19c. The AND gates 19b and 19c have outputs applied to the sexidecimal counter 19d and the octal counter 19e, respectively. The sexidecimal counter 19d has an output applied to a reset terminal R of the octal counter 19e and a set input terminal S of the RS-FF 19f. The octal counter 19e has an output applied to a reset terminal R of the sexidecimal counter 19d and a reset input terminal R of the RS-FF 19f.

The sexidecimal counter 19d and the octal counter 19e count sixteen pulses and eight pulses of the third output signal $\phi_3$ from the AND gates 19d and 19c, respectively and generate output signals each having a predetermined pulse width, which counters always perform counting operation.

Furthermore, the D-FFs 14, 15 and 19a are adapted such that data applied to the D terminal are accepted at the falling edge of clock signals inputted to the C terminals, respectively.

Figure 6:
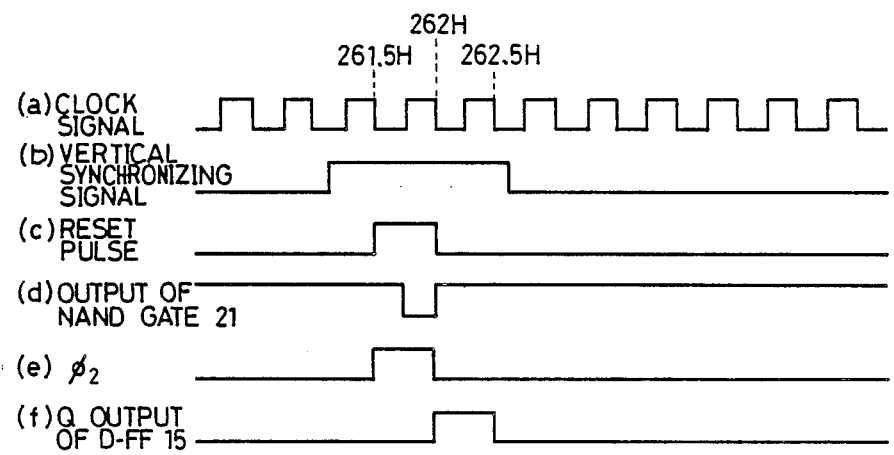

Description is now made on operation of the circuit shown in FIG. 5. The $\overline{Q}$ output of the RS-FF 19f in the phase comparing circuit 19 is applied to one terminal in the AND gates 18b, 18d and 13a and the Q output thereof is applied to the AND gates 18a, 18c and 13b. It is assumed that the above described Q output is at the "L" level and the $\overline{Q}$ output is at the "H" level. In this state, when a vertical synchronizing signal as shown in FIG. 6(b) arrives from the vertical synchronizing separation circuit 9, a signal at the "H" level is applied to the OR gate 13c at timing of the rising of the above described vertical synchronizing signal, because the sixth output signal $\phi_6$ at the "H" level is applied to the AND gate 13a from the 224th H. Thus, the signal at the "H" level is applied to the D input of the D-FF 14 at timing of the rising of the vertical synchronizing signal. A clock signal of $2f_H$ as shown in FIG. 6(a) is applied to the C terminal of the D-FF 14. Since the D-FF 14 is adapted such that operation for accepting data is performed at the falling edge of the clock signal, the signal at the "H" level is transferred to the Q output at timing of the falling of the clock signal at the 261.5th H. Thus, the vertical count down circuit 11 is reset by the Q output of the D-FF 14. Accordingly, the sixth output signal $\phi_6$ attains the "L" level and the outputs of the AND gate 13a and the OR gate 13c attain the "L" level. Thus, a signal at the "L" level is applied to the D terminal of the D-FF 14. Therefore, the signal at the "L" level is transferred to the Q output at the next falling edge of the clock signal of $2f_H$, that is, at the 262th H. Thus, a reset signal having a pulse width of 0.5H as shown in FIG. 6(c) is generated from the D-FF 14. The reset signal, together with the clock pulse of $2f_H$ as shown in FIG. 6(a), is applied to the NAND gate 21, so that a pulse as shown in FIG. 6(d) is generated as an output thereof and applied to the C terminal of the D-FF 19a through the AND gate 18d and the OR gate 18f.

On the other hand, the second output signal $\phi_2$ as shown in FIG. 6(e) which rises at the 261.5th H is derived from the vertical count down circuit 11 and applied to the D terminal of the D-FF 15. The second output signal $\phi_2$ is delayed by 0.5H in the D-FF 15 to be a signal having a pulse width of 0.5H as shown in FIG. 6(f). The Q output of the D-FF 15 is applied to the D terminal of the D-FF 19a through the AND gate 18b and the OR gate 18e. Therefore, a signal at the "L" level as shown in FIG. 6(f) applied to the D terminal is transferred to the Q output at timing of the falling of the signal as shown in FIG. 6(d) applied to the C terminal of the D-FF 19a. Thus, the Q output of the D-FF 19a attains the "L" level and the $\overline{Q}$ output thereof attains the "H" level. Accordingly, the third output signal $\phi_3$ is applied to the octal counter 19e through the AND gate 19c. When eight pulses of the third output signal $\phi_3$ are counted in the octal counter 19e, the octal counter 19e resets the RS-FF 19f and the sexidecimal counter 19d. At that time, since the RS-FF 19f is reset, the Q output of the RS-FF 19f attains the "L" level and the Q output thereof remains the "H" level. As a result, the vertical count down circuit 11 generates a vertical driving pulse corresponding to the vertical synchronizing signal in the video signal to the output terminal 20.

Figure 7:
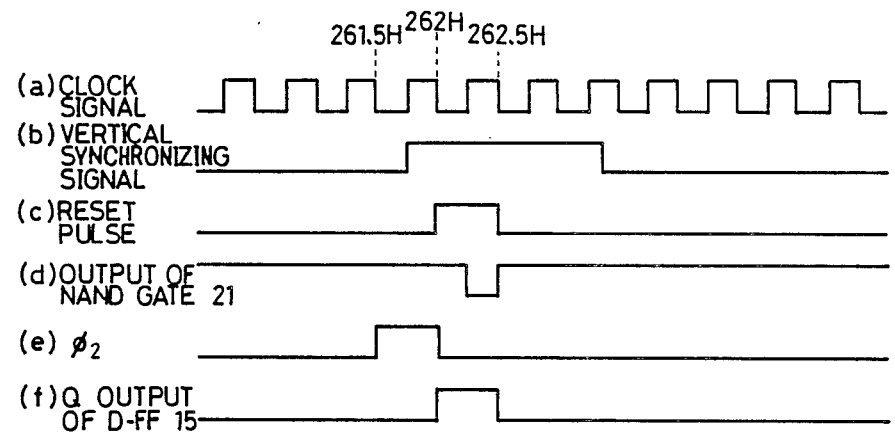

When the vertical synchronizing signal in the television signal which rises in the period of 261.5H to 262H as shown in FIG. 7(b) arrives from the vertical synchronizing separation circuit 9, the vertical synchronizing signal is applied to the D terminal of the D-FF 14 through the AND gate 13a and the OR gate 13c, in the same manner as the above described vertical synchronizing signal in the video signal. Thus, the signal at the "H" level is transferred to the Q output at the falling edge of 262H of a clock signal as shown in FIG. 7(a) applied to the C terminal in the D-FF 14, so that the vertical count down circuit 11 is reset. At that time, a reset pulse outputted from the D-FF 14 is shown in FIG. 7(c). Therefore, a signal as shown in FIG. 7(d) is generated from the NAND gate 21 and applied to the C terminal of the D-FF 19a through the AND gate 18d and the OR gate 18f.

On the other hand, similarly to the above described case, the second output signal $\phi_2$ as shown in FIG. 7(e) is applied to the D terminal of the D-FF 15, the Q output being shown in FIG. 7(f). The Q output of the D-FF 15 is applied to the D terminal of the D-FF 19a through the AND gate 18b and the OR gate 18e. Therefore, a signal at the "H" level, as shown in FIG. 7(f), applied to the D terminal is transferred to the Q output at timing of the falling of the signal as shown in FIG. 7(d) applied to the C terminal of the D-FF 19a. Thus, the Q output of the D-FF 19a is inverted to the "H" level and the $\overline{Q}$ output is inverted to the "L" level. Accordingly, the third output signal $\phi_3$ is applied to the sexidecimal counter 19d through the AND gate 19b. When sixteen pulses of the third output signal $\phi_3$ are counted in the sexidecimal counter 19d, the sexidecimal counter 19d sets the RS-FF 19f and resets the octal counter 19e. Thus, the Q output in the RS-FF 19f is inverted to the "H" level and the $\overline{Q}$ output thereof is inverted to the "L" level. As a result, the second output signal $\phi_2$ is applied to the D terminal of the D-FF 14 through the AND gate 13d and the OR gate 13c. In addition, the Q output of the RS-FF 17 is applied to the OR gate 18e through the AND gate 18a and the first output signal $\phi_1$ is applied to the OR gate 18f through the AND gate 18c. Since the second output signal $\phi_2$ is applied to the D terminal of the D-FF 14, the vertical count down circuit 11 performs self-reset operation, so that the vertical driving pulse having a period of 262.5H is generated in the output terminal 20.

On the other hand, in this state, assuming that timing of the rising of the vertical synchronizing signal included in the television signal from the vertical synchronizing separation circuit 9 is slightly out of the period of 261.5H to 262H as shown in FIG. 8(b), the vertical synchronizing signal passes through the AND gate 16 controlled by the fourth output signal $\phi_4$ as shown in FIG. 8(c) and is applied to the set input S of the RS-FF 17. Therefore, the Q output of the RS-FF 17, which is shown in FIG. 8(d), is applied to the D input of the D-FF 19a through the AND gate 18a and the OR gate 18e. In addition, the vertical count down circuit 11 is reset by a reset pulse corresponding to the second output signal $\phi_2$ as shown in FIG. 8(e). Therefore, the first output signal $\phi_1$ as shown in FIG. 8(f) is applied to the C terminal of the D-FF 19a. The D-FF 19a makes the Q output thereof the "H" level at the falling edge of the first output signal $\phi_1$, that is, at timing of 4H. Since the Q output of the D-FF 19a has been already at the "H" level by the above described operation, the state does not change. Therefore, the RS-FF 19f always holds the state where the television signal is received. The RS-FF 17 is reset at the 8th H by the third output signal $\phi_3$.

Therefore, after it is determined that the television signal is received, the vertical count down circuit 11 is switched into the self-reset operation and a window is provided for an externally arriving vertical synchronizing signal using the fourth output signal $\phi_4$. Only if the arriving vertical synchronizing signal is outside the window, self-reset operation of the vertical count down circuit 11 is released, so that sensitivity of determination can be switched and abnormal switching can be prevented. More specifically, the television signal may be temporarily of a weak electric field by radio interference of an airplane or the like so that the vertical synchronizing signal may be out of period. If the vertical count down circuit 11 is switched each time, the pictures become unclear. Therefore, a shift of the period is permitted to a certain extent within the range of the window so that the unclear pictures due to abnormal switching are prevented.

Then, switching to the external apparatus and the other channel is made. When a vertical synchronizing signal whose phase is disturbed having a long period as shown in FIG. 8(g) arrives from the vertical synchronizing separation circuit 9, the vertical synchronizing signal can not pass through the AND gate 16, because it is outside the window using the fourth output signal $\phi_4$, so that the Q output of the RS-FF 17 attains the "L" level. Thus, the D terminal of the D-FF 19a is always at the "L" level. In addition, since the first output signal $\phi_1$ is applied to the C terminal, the signal at the "L" level is generated in the Q output at the timing of the falling edge of the first output signal $\phi_1$ at the 4th H. Therefore, when the third output signal $\phi_3$ is applied to the octal counter 19e through the AND gate 19c, where eight pulses thereof are counted, the third output signal $\phi_3$ resets the RS-FF 19f and the sexidecimal counter 19d. Thus, the Q output is inverted to the "L" level and the $\overline{Q}$ output is inverted to the "H" level so that the input selecting circuit 13 accepts the vertical synchronizing signal externally applied.

It is well known that a vertical synchronizing signal generated at the time of special reproduction (double speed reproduction and still reproduction) of a VTR is referred to as a pseudo vertical synchronizing signal and the period thereof differs every 1V (V is one period of a normal vertical synchronizing signal). If a pseudo vertical synchronizing signal which repeats the period of 262.5H and the other period every 1V is generated, an output signal of the delay circuit 15 and a reset pulse are applied to the phase comparing circuit 19 through the signal selecting circuit 18. In such a case, the phases of those signals are compared in the D-FF 19a in the phase comparing circuit 19 and the Q output and the $\overline{Q}$ output are inverted every 1V. Therefore, the third output signal $\phi_3$ passes through the AND gates 19b and 19c every 1V and is applied to the sexidecimal counter 19d and the octal counter 19e. As a result, the octal counter 19e first generates an output signal, resets the RS-FF 19f and makes the Q output the "L" level. Thus, the vertical count down circuit 11 is reset in response to the above described pseudo vertical synchronizing signal, so that the desired vertical driving pulse can be applied to the terminal 20. More specifically, in the circuit shown in FIG. 5, since different maximum count values, 16 and 8, of counters connected to an output terminal of the AND gates 19b and 19c are used, it can be determined that the video signal is received when pulses are equally applied to each counter. As a result, the accuracy of determination can be increased and a vertical driving pulse can be stably obtained.

When the vertical synchronizing signal does not arrive while the $\overline{Q}$ output in the RS-FF 19f is at the "H" level and hence, the input selecting circuit 13 selects an arriving vertical synchronizing signal, the vertical count down circuit 11 is self-reset by the seventh output signal $\phi_7$ at the 297th H and has a period of 297H.

Figure 9:
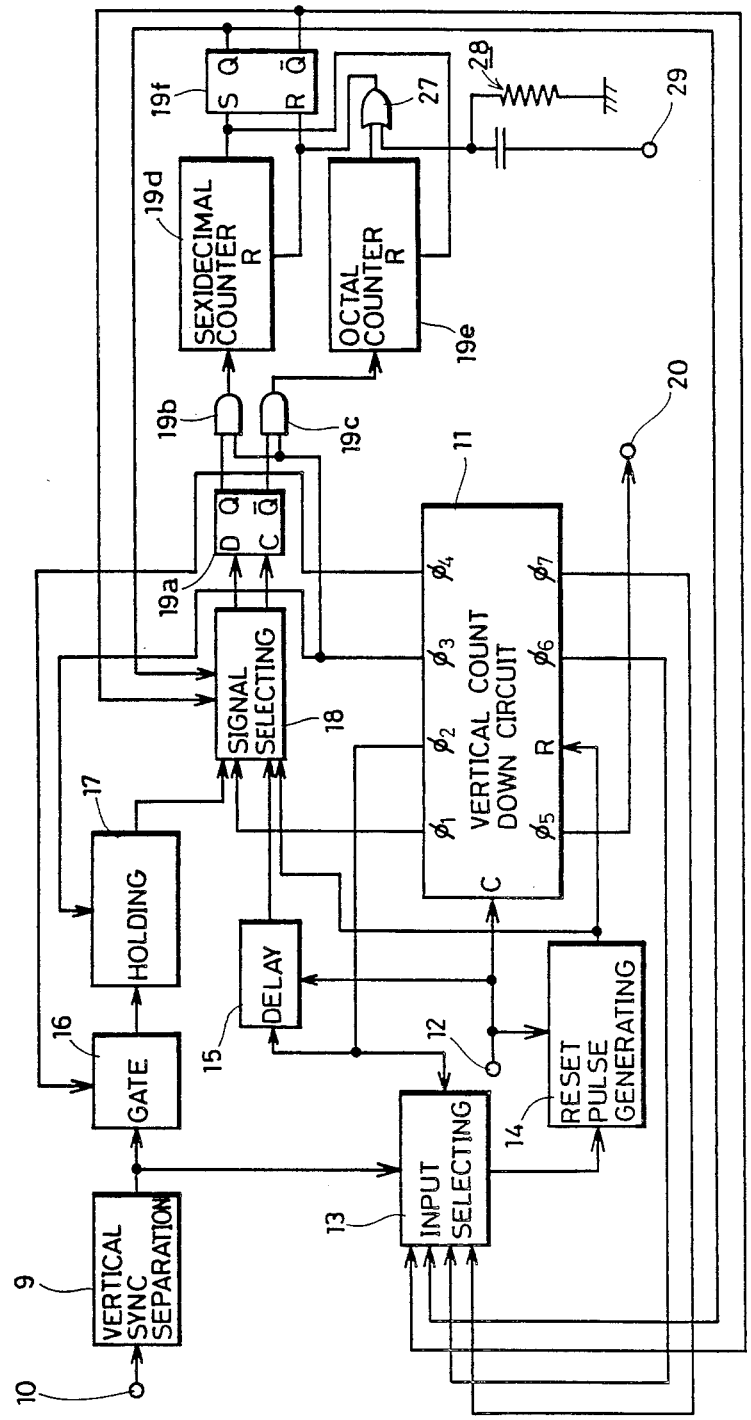
FIG. 9 is a block diagram showing a vertical driving pulse generating circuit according to another embodiment of the present invention.

FIG. 9 is a circuit diagram showing another embodiment of the present invention. The present embodiment has the same structure as the embodiment shown in FIGS. 2 and 5, except for the following. The corresponding portions have the same reference numerals and the description thereof is omitted. According to the embodiment, an OR gate 27, a differentiation circuit 28 and a terminal 29 are newly added. The output of the octal counter 19e is applied to one input terminal of the OR gate 27. The OR gate 27 has another input terminal receiving an output of the differentiation circuit 28. The differentiation circuit 28 differentiates a channel switching signal applied to a terminal 29. The OR gate 27 has an output applied to the reset input terminal R in the RS-FF 19f and the reset terminal in the sexidecimal counter 19d.

Figure 1:
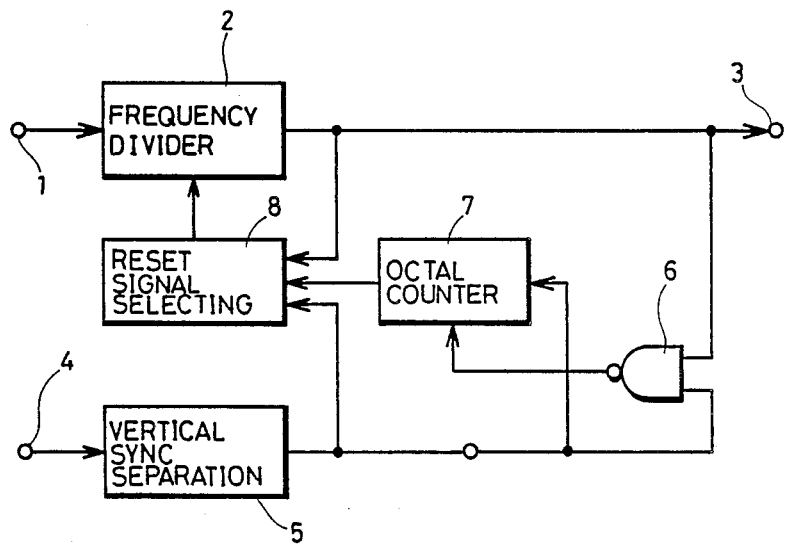
FIG. 1 is a block diagram showing a conventional vertical driving pulse generating circuit.

Description is now made on operation according to the embodiment shown in FIG. 9. It is pointed out that the present embodiment is the same as the embodiments shown in FIGS. 1 and 5, except for operation at the time of switching of a channel as described below.

It is assumed that an input signal applied to the terminal 10 is a composite sync signal in the television signal, the input selecting circuit 13 selects and outputs the second output signal $\phi_2$ and the vertical count down circuit 11 is self-reset. In this state, when a television broadcasting channel switching is made, a channel switching signal is applied from the terminal 29 to the differentiation circuit 28 to be differentiated and applied to the OR gate 27. The output of the OR gate 27 resets both the sexidecimal counter 19d and the RS-FF 19f. Thus, the Q output in the RS-FF 19f is inverted to the "L" level and the $\overline{Q}$ output thereof is inverted to the "H" level. Therefore, the input selecting circuit 13 selects and outputs the externally arriving vertical synchronizing signal after channel switching. As a result, the vertical count down circuit 11 is immediately reset by a reset pulse corresponding to the vertical synchronizing signal, so that a vertical driving pulse which is in synchronization with the vertical synchronizing signal after switching of the channel is immediately obtained in the output terminal 20.

Therefore, according to the embodiment shown in FIG. 9, when the channel is switched with the television signal being received and the vertical count down circuit 11 performing self-reset operation, the above described vertical count down circuit 11 is immediately reset by the channel switching signal, and the vertical driving pulse corresponding to the vertical synchronizing signal after switching of the channel are quickly obtained, so that vertical synchronization can be quickly acquired. As a result, the problem that a blanking pulse appears on the pictures at the time of switching of the channel can be solved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A vertical driving pulse generating circuit for determining whether or not a period of a vertical synchronizing signal included in a video signal to be displayed coincides with a predetermined normal vertical scanning period and generating a first vertical driving pulse having the same period as that of said vertical synchronizing signal when they do not coincide with each other and a second vertical driving pulse having the same period as that of the normal vertical scanning period when they coincide with each other, comprising:

vertical synchronizing signal separating means (9) for separating a vertical synchronizing signal included in said video signal,
   clock signal inputting terminal (12) for inputting a clock signal having a frequency N (N is a positive integer) times a predetermined normal horizontal scanning frequency to a television signal,
   signal generating means (11) responsive to said clock signal for generating a plurality of timing signals which are in synchronization with the clock signal and said first and second vertical driving pulses,
   input selecting means (13) receiving the vertical synchronizing signal separated by said vertical synchronizing signal separating means (9) and a first timing signal having the same period as said normal vertical scanning period out of said plurality of timing signals for selecting and outputting one of them,
   reset pulse generating means (14) responsive to an output of said input selecting means for generating a reset pulse for resetting said signal generating means,
   signal selecting means (18) for selecting and outputting said reset pulse and said first timing signal or said vertical synchronizing signal and a second timing signal out of said plurality of timing signals, and
   phase comparing means (19) for comparing phases of two signals selectively outputted from said signal selecting means and controlling selection by said input selecting means and said signal selecting means depending on whether or not the phases coincide with each other,
   said signal generating means being reset with the same period as that of the vertical synchronizing signal and generating said first vertical driving pulse with the same period as that of the vertical synchronizing signal when said input selecting means selects said vertical synchronizing signal, and being reset with a constant period defined by the first timing signal and a generating said second vertical driving pulse with the constant period when said input selecting means selects said first timing signal.

2. A vertical driving pulse generating circuit in accordance with claim 1, wherein
   said signal generating means comprises
   frequency dividing means (11a~11j) for frequency-dividing said clock signal, and
   decoding means (11k~11r) for decoding an output of said frequency dividing means.

3. A vertical driving pulse generating circuit in accordance with claim 1, further comprising:
   first gate means (16) for passing a vertical synchronizing signal having a period which is substantially equal to said predetermined normal vertical scanning period out of vertical synchronizing signals separated by said vertical synchronizing signal separating means, and
   holding means (17) for holding an output of said first gate means during a predetermined period and applying said output to said signal selecting means.

4. A vertical driving pulse generating circuit in accordance with claim 3, wherein said first gate means is opened or closed in response to a third timing signal out of the plurality of timing signals generated from said signal generating means.

5. A vertical driving pulse generating circuit in accordance with claim 1, wherein
   said phase comparing means comprises
   complementary output generating means (19a) for generating two logical outputs having complementary relation, depending on whether or not the phases of the two signals outputted from said signal selecting means coincide with each other,
   a first gate means (19b or 19c) responsive to one output of said complementary output generating means for gating a third timing signal out of said plurality of timing signals,
   a second gate means (19c or 19b) responsive to the other output of said complementary output generating means for gating said third timing signal,
   first counting means (19d or 19e) for counting pulses of said third timing signal which passes through said first gate means and completing counting when the count attains a predetermined value,
   second counting means (19e or 19d), for counting pulses of said third timing signal which passed through said second gate means and completing counting when the count attains a predetermined value, and state storing means (19f) for storing a first state in response to an output signal caused by completion of counting of one of said first and second counting means and storing a second state in response to an output signal caused by the completion of counting the other of said first and second counting means.

6. A vertical driving pulse generating circuit in accordance with claim 5, wherein said first and second counting means have different values of completion of counting, each counting means being reset in response to the completion of counting by the other.

7. A vertical driving pulse generating circuit in accordance with claim 1, wherein said vertical driving pulses are applied to a television receiver, and which further comprises:

channel switching signal inputting means (29) for inputting a channel switching signal indicating that a channel switching is made in said television receiver, and means (27, 28) responsive to said channel switching signal for inverting a phase comparing output of said phase comparing means.

* * * * *